(12) United States Patent
Someda et al.

(10) Patent No.: US 6,332,374 B1
(45) Date of Patent: Dec. 25, 2001

(54) ACCELERATOR POSITION SENSOR

(75) Inventors: Atsushi Someda, Hyogo; Koichi Takada, Tokyo, both of (JP)

(73) Assignee: Bando Chemical Industries, Ltd. (JP)

( * ) Notice: Subject to any disclaimer, the term of this patent is extended or adjusted under 35 U.S.C. 154(b) by 0 days.

(21) Appl. No.: 09/297,099

(22) PCT Filed: Oct. 2, 1998

(86) PCT No.: PCT/JP98/04473

§ 371 Date: May 19, 1999

§ 102(e) Date: May 19, 1999

(87) PCT Pub. No.: WO99/18418

PCT Pub. Date: Apr. 15, 1999

(30) Foreign Application Priority Data

Oct. 3, 1997 (JP) .................................................. 9-271569

(51) Int. Cl.[7] .............................. G05G 1/14; F16D 63/00; G01B 7/30; G01B 7/14

(52) U.S. Cl. ................................ 74/514; 33/1 PT; 188/83; 324/207.11; 324/207.25; 74/513

(58) Field of Search ................................. 33/1 N, 1 PT, 33/706, 707, 708, 600, 613; 340/146.2, 286; 324/207.13, 207.15, 207.2, 207.25, 207.26, 207.11; 74/514, 513; 188/83

(56) References Cited

U.S. PATENT DOCUMENTS

| | | | |
|---|---|---|---|
| 1,495,061 | * | 5/1924 | Bailhe ......................... 74/513 |
| 1,830,441 | * | 11/1931 | Mulhollen ....................... 74/513 |
| 2,145,665 | * | 1/1939 | Rodgers ......................... 74/513 |
| 2,822,902 | * | 2/1958 | Glick ............................ 74/513 |
| 2,916,946 | * | 12/1959 | Harrison ........................ 74/513 |
| 3,188,860 | * | 6/1965 | Roberts ......................... 33/1 PT |
| 3,210,852 | * | 10/1965 | Herndon ......................... 33/1 PT |
| 3,580,370 | * | 5/1971 | McCammom ....................... 74/513 |
| 4,505,151 | * | 3/1985 | Sauerschell et al. .............. 73/116 |
| 4,944,269 | * | 7/1990 | Imoehl .......................... 123/399 |
| 5,655,311 | * | 8/1997 | Affa ............................ 33/706 |
| 5,716,071 | * | 2/1998 | Stanley et al. .................. 280/407.1 |
| 5,842,281 | * | 12/1998 | Mieling ......................... 33/203.18 |
| 5,855,072 | * | 1/1999 | Nakaho .......................... 33/1 PT |
| 6,002,126 | * | 12/1999 | Feichtinger ..................... 250/231.13 |
| 6,003,404 | * | 12/1999 | Hannewald ....................... 74/513 |
| 6,240,801 | * | 6/2001 | Kojima et al. ................... 74/513 |

FOREIGN PATENT DOCUMENTS

| | | | |
|---|---|---|---|
| 3732427-A1 | * | 4/1989 | (DE) ............................ 74/513 |
| 88/06713 | * | 9/1988 | (JP) ............................ 33/706 |
| 3-019895 | | 3/1991 | (JP) . |
| 4-121432 | | 4/1992 | (JP) . |
| 6-024888 | | 4/1994 | (JP) . |
| 9-048260 | | 2/1997 | (JP) . |
| 9-48259 | | 2/1997 | (JP) . |
| 10-324173 | | 12/1998 | (JP) . |
| WO-089007706-A | | 8/1989 | (WO) ............................ 74/513 |

* cited by examiner

*Primary Examiner*—Diego Gutierrez
*Assistant Examiner*—Maria Fernandez
(74) *Attorney, Agent, or Firm*—Nixon Peabody LLP; Thomas W. Cole

(57) ABSTRACT

An accelerator position sensor urges a rotary member 2 into rotation relative to a fixed member 1 fixed on the side of a vehicle body in a direction of a returning operation of an accelerator pedal by torque of a torsion spring 3, and detects the angle of rotation of the rotary member 2 in a sensor unit 4 thereof. In the accelerator position sensor, a cylindrical resin member 6 is disposed between a boss 1a of the fixed member 1 and the torsion spring 3 so as to be pressed against the boss 1a by a reaction of the torque of the torsion spring 3 to create sliding resistance to the boss 1a during rotation of the rotary member 2, in order that the pressing force characteristic of the accelerator pedal exhibits sufficient hysteresis between pressing and returning operations.

8 Claims, 4 Drawing Sheets

ACCELERATOR POSITION SENSOR

TECHNICAL FIELD

This invention relates to an accelerator position sensor, drivingly connected to an accelerator pedal in a vehicle, for detecting the accelerator position, and relates in particular to measures of imparting hysteresis to the pressing force characteristic of the accelerator pedal when the accelerator position sensor is drivingly connected directly to the accelerator pedal without interposing any cable therebetween.

BACKGROUND ART

Recently, vehicles equipped with an electronically controlled throttle for example have a tendency to employ an accelerator position sensor which is drivingly connected to the accelerator pedal and detects the position of the accelerator pedal.

A conventional accelerator position sensor will be described here. The accelerator position sensor includes: a fixed member having a boss and fixed on the side of a vehicle body; a rotary member which has a shaft rotatably fitted in the boss and is connected to the accelerator pedal of the vehicle through a cable to rotate in response to pressing and returning operations of the accelerator pedal; a torsion spring, interposed in a position fitted on the boss of the fixed member between the fixed and rotary members, for urging the rotary member into rotation relative to the fixed member in a direction of the returning operation of the accelerator pedal by torque of the torsion spring; and a sensor unit for detecting the angle of rotation of the rotary member relative to the fixed member.

When the accelerator position sensor is placed in an engine room, as schematically shown in FIG. 4, the accelerator position sensor a is drivingly connected to a lever d of the accelerating pedal c through the cable b thereby urging the accelerator pedal c into return movement to its original position by torque of the torsion spring. Further, in the engine room, a return spring e is placed for pulling the cable b in a direction of returning the accelerator pedal c to its original position.

Meanwhile, the preferable pressing force characteristic of the accelerator pedal c is generally regarded to as having such hysteresis that the pressing force of the accelerator pedal becomes larger during the pressing operation while it becomes slightly smaller during the returning operation. As for this point, in the conventional accelerator position sensor a mentioned above, though torque of the torsion spring increases or decreases with the angle of rotation of the rotary member, hysteresis of the torsion spring in the rotational direction of the rotary member is comparatively small. However, since the operation of the accelerator pedal c creates sliding resistance in the cable b, the sliding resistance provides the pressing force characteristic having the hysteresis as mentioned above.

Specifically, during the pressing operation of the accelerator pedal c, sliding resistance in the cable b is added to the torque of the torsion spring in the accelerator position sensor a and the tension of the return spring e, thereby increasing the pressing force against the accelerator pedal c. On the other hand, during the returning operation of the accelerator pedal c, the torque and the tension are diminished by the sliding resistance in the cable b, thereby decreasing the pressing force against the accelerator pedal c.

However, when the conventional accelerator position sensor a is drivingly connected directly to the accelerator pedal c without interposing the cable b therebetween, the sensor a cannot use the sliding resistance in the cable b, and therefore is difficult to obtain the above-mentioned hysteresis.

The present invention has been made in view of the above problem, and therefore has its object of obtaining sufficient hysteresis between the pressing and returning operations in terms of the pressing force characteristic of the accelerator pedal by simply making a small change in the internal structure of the accelerator position sensor when the accelerator position sensor is drivingly connected directly to the accelerator pedal without interposing any cable therebetween.

DISCLOSURE OF INVENTION

To attain the above object, in the present invention, a cylindrical resin member rotatable as a unit with a rotary member is disposed between a boss of a fixed member and a torsion spring, the resin member is pressed against the boss by a reaction of torque of the torsion spring so that sliding resistance is produced between the cylindrical resin member and the boss during the rotation of the rotary member, and the sliding resistance provides the above-mentioned hysteresis.

Specifically, an accelerator position sensor of the present invention comprises: a fixed member having a boss and fixed on the side of a vehicle body; a rotary member which has a shaft rotatably fitted in the boss of the fixed member and is connected to an accelerator pedal of the vehicle to rotate in response to pressing and returning operations of the accelerator pedal; a torsion spring, interposed in a position fitted on the boss of the fixed member between the fixed and rotary members, for urging the rotary member into rotation relative to the fixed member in a direction of the returning operation of the accelerator pedal by torque of the torsion spring; a cylindrical resin member which is interposed between the boss of the fixed member and the torsion spring to rotate as a unit with the rotary member and is pressed against the boss by a reaction of the torque of the torsion spring to create sliding resistance to the boss during the rotation of the rotary member; and sensing means for detecting the angle of rotation of the rotary member relative to the fixed member.

With this arrangement, the rotary member is urged into rotation relative to the fixed member in the direction of the returning operation of the accelerator pedal by the torque of the torsion spring. Though the torque is increased or decreased with the angle of rotation of the rotary member, hysteresis of the torque of the torsion spring in the rotational direction of the rotary member is small.

In this case, the cylindrical resin member is interposed between the boss of the fixed member and the torsion spring located around the boss, is pressed at a part of the inner periphery thereof against the boss by a reaction of the torque of the torsion spring, and rotates as a unit with the rotary member. Under this arrangement, the rotation of the rotary member creates sliding resistance between the inner periphery of the cylindrical resin member and the outer periphery of the boss, and the sliding resistance damps the rotation of the rotary member.

Accordingly, output torque developing on the rotary member when rotating opposite to the direction of the returning operation of the accelerator pedal, namely, a pressing force required for the pressing operation of the accelerator pedal, is increased by the damping force over the initial torque since the damping force is added to the initial torque. On the other hand, output torque developing on the rotary member when rotating in the direction of the returning operation of the accelerator pedal, namely, a pressing force required for the returning operation of the accelerator pedal, is decreased by the damping force under the initial torque since the initial torque is damped by the damping force.

Consequently, when the accelerator position sensor is drivingly connected directly to the accelerator pedal without interposing any cable therebetween, the pressing force characteristic of the accelerator pedal can attain sufficient hysteresis between the pressing and returning operations by simply making the small change as described above in the internal structure of the accelerator position sensor.

In the above-mentioned accelerator position sensor, when the torsion spring is interposed under axial compression between the fixed and rotary members, the cylindrical resin member may include a cylindrical body slidably fitted on the boss of the fixed member, and a flange radially outwardly extending from the outer periphery of the cylindrical body and held axially sandwiched under pressure between the torsion spring and the rotary member.

With this arrangement, the cylindrical resin member includes the cylindrical body slidably fitted on the boss of the fixed member and a flange radially outwardly extending from the outer periphery of the cylindrical body. In this case, the flange is held axially sandwiched by a compressive force of the torsion spring between the torsion spring and the rotary member. This allows the cylindrical resin member to be readily rotated as a unit with the rotary member. Accordingly, the operation of the accelerator position sensor can be performed in a specific and proper manner.

BEST MODE FOR CARRYING OUT THE INVENTION

An embodiment of the present invention will be described with reference to FIGS. 1 through 3.

Figure 2:
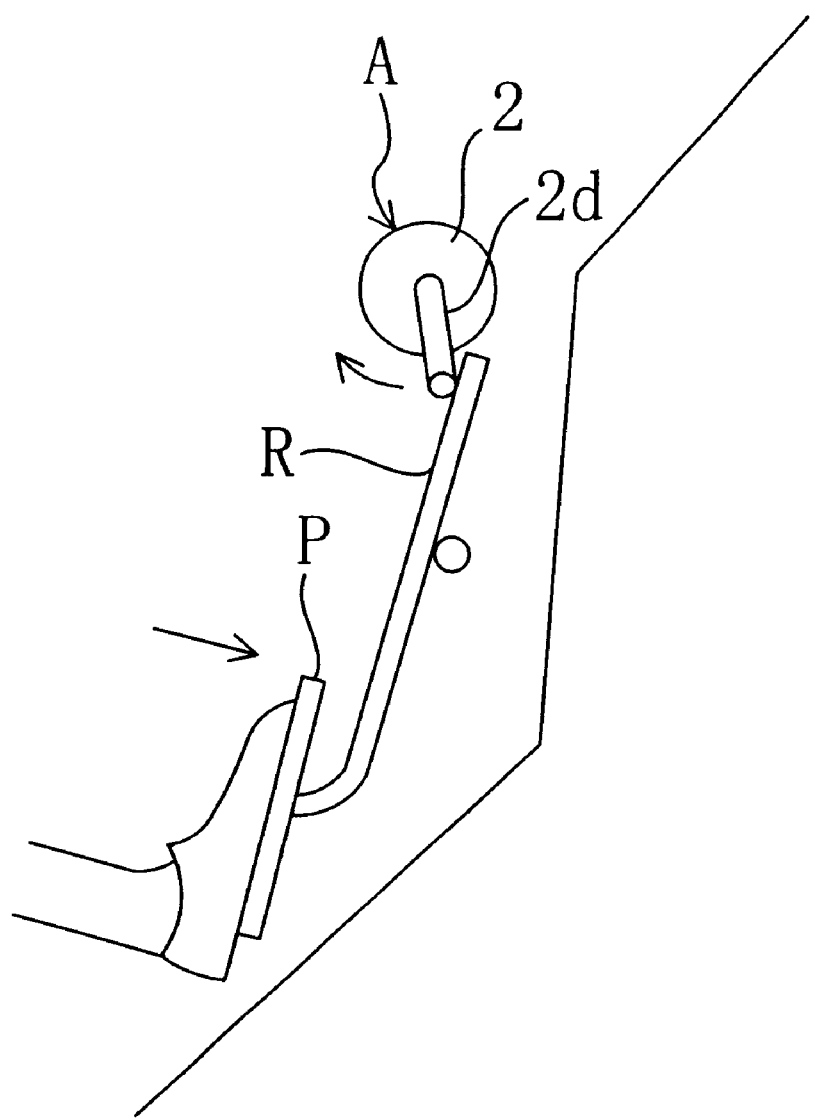
FIG. 2 is a side view schematically showing the accelerator position sensor in a state drivingly connected directly to an accelerator pedal.

FIG. 2 schematically shows an accelerator pedal mechanism equipped with an accelerator position sensor A according to the embodiment of the present invention. In this accelerator pedal mechanism, the accelerator position sensor A is used to impart a specified pressing force characteristic to an accelerator pedal P in a vehicle having an electronically controlled throttle for example, and is used to detect the position of the accelerator pedal P and output the detection signal to an unshown CPU for controlling the operation of the throttle.

Figure 1:
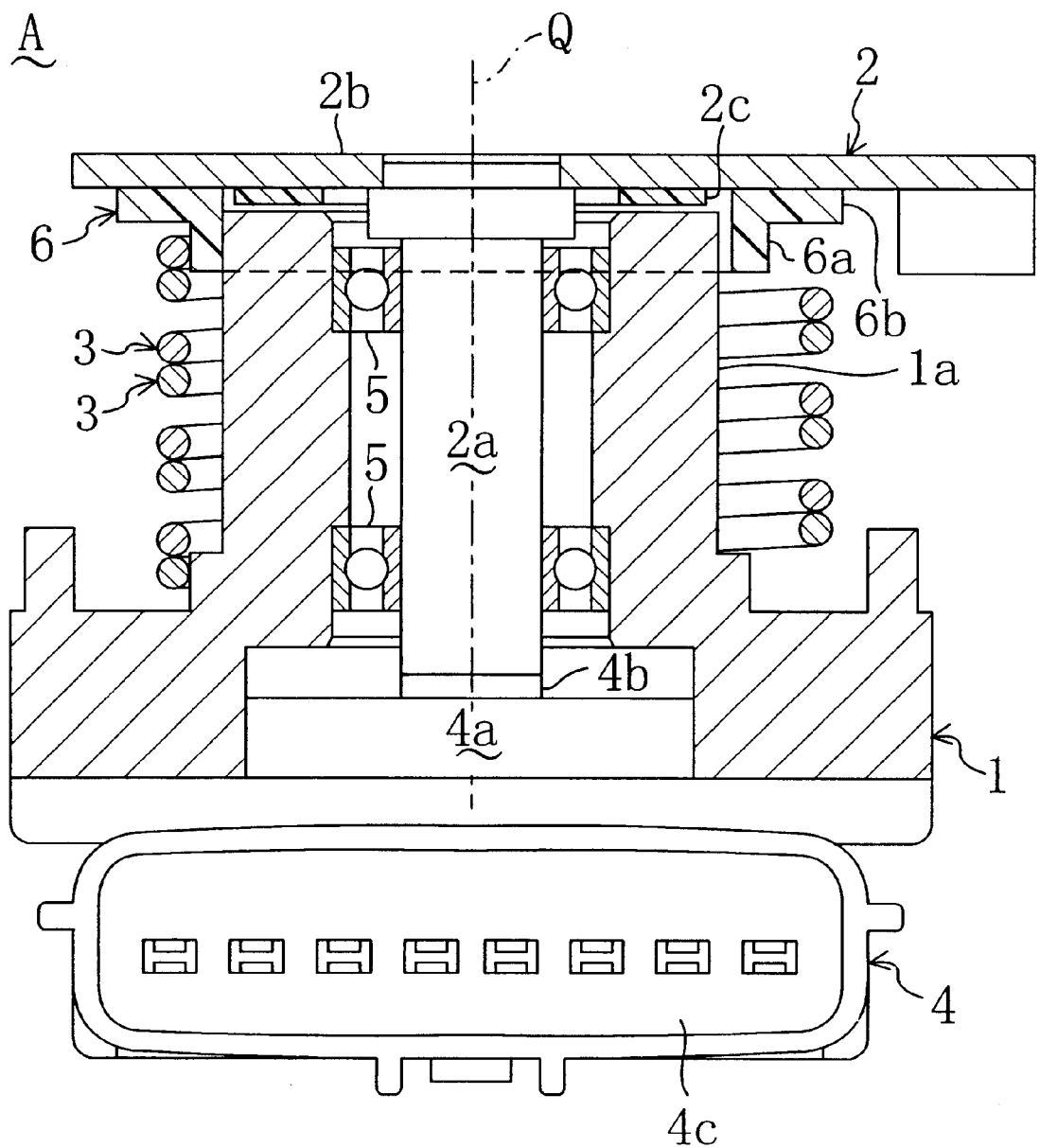
FIG. 1 is a longitudinal sectional view showing the structure of an accelerator position sensor according to an embodiment of the present invention.

As shown in an enlarged manner in FIG. 1, the accelerator position sensor A includes: a fixed member 1 having a boss 1a and fixed on the side of a vehicle body; a rotary member 2 which has a shaft 2a rotatably fitted in the boss 1a of the fixed member 1 and is connected to a lever R of the accelerator pedal P to rotate around the axis Q of the boss 1a in response to pressing and returning operations of the accelerator pedal P; torsion springs 3, interposed in a position fitted on the boss 1a of the fixed member 1 between the fixed member 1 and the rotary member 2, for urging the rotary member 2 into rotation relative to the fixed member 1 in a direction of the returning operation of the accelerator pedal P (in a clockwise direction in FIG. 2), namely, in the opposite direction of the pressing operation of the accelerator pedal P (opposite to a counterclockwise direction in FIG. 2), by torque of the torsion springs 3; and a sensor unit 4 as sensing means for detecting the angle of rotation of the rotary member 2 relative to the fixed member 1.

More specifically, between the boss 1a of the fixed member 1 and the shaft 2a of the rotary member 2, a couple of ball bearings 5, 5 for rotatably holding the shaft 2a in the boss 1a are concentrically arranged in an axial direction (in a vertical direction in FIG. 1). Further, the rotary member 2 includes, in addition to the shaft 2a, a rotary disk 2b coupled to the base end of the shaft 2a (the upper end thereof in FIG. 1) for unitary rotation with the shaft 2a. To a portion of the rotary disk 2b opposed to one end surface of the boss 1a of the fixed member 1 (the top face thereof in FIG. 1), a resin member 2c is applied so as to be capable of sliding contact with the end surface of the boss 1a. As shown in FIG. 2, the rotary disk 2b is provided with an arm 2d coupled to the lever R of the accelerator pedal P and extending in a radially outward direction.

The sensor unit 4 includes a body 4a secured to one end of the boss 1a of the fixed member 1 (the bottom end thereof in FIG. 1) by screws, a rotor 4b extending along the axis Q from the body 4a toward the boss 1a, and a connector 4c for outputting a detection signal to the CPU. The rotor 4b is coupled at an end thereof to the end of the shaft 2a of the rotary member 2 for unitary rotation with the shaft 2a.

In this embodiment, a couple of torsion springs 3, 3 are used in axially interdigitated positions. Each torsion spring 3 has a left-handed coil portion, and both unshown engaging ends thereof are engaged with the fixed member 1 and the rotary member 2, respectively, with the coil portion twisted in a direction of reducing the diameter. Accordingly, the rotary member 2 is urged into rotation clockwise when viewed from the fixed member 1 by torque of the torsion springs 3, 3 in a direction of increasing their diameters, thereby urging the accelerator pedal P coupled to the rotary member 2 into movement in the direction of the returning operation. Further, the torsion springs 3, 3 are interposed under axial compression between the fixed member 1 and the rotary member 2 to urge the fixed and rotary members 1 and 2 into axial movement away from each other.

Furthermore, in this embodiment, a cylindrical resin member 6 is disposed between the boss 1a of the fixed member 1 and the torsion springs 3, 3 so as to rotate as a unit with the rotary member 2, and is pressed against the boss 1a by a reaction of the torque of the torsion springs 3, 3 thereby creating sliding resistance to the boss 1a during the rotation of the rotary member 2.

Specifically, the cylindrical resin member 6 includes a cylindrical body 6a slidably fitted on the boss 1a of the fixed member 1 and having upper and lower end openings, and a flange 6b radially outwardly extending from an edge of one of the openings of the cylindrical body 6a (upper opening edge thereof in FIG. 1). The flange 6b is held axially sandwiched between the torsion springs 3, 3 and the rotary disk 2b of the rotary member 2 and into grippingly engagement with the rotary disk 2b under the urgence of the compressed torsion springs 3, 3, which allows the cylindrical resin member 6 to unitarily rotate with the rotary member 2.

Next, the operation of the accelerator position sensor A having the above-mentioned structure will be described with reference to the plot of FIG. 3. In the accelerator position sensor A, the rotary member 2 is urged into rotation relative to the fixed member 1 in the direction of the returning operation of the accelerator pedal P by torque of the torsion springs 3, 3. In this case, the torque of the torsion springs 3, 3 increases and decreases with the amount of torsion of the torsion springs 3, 3 in a direction to reduce their diameters, namely, with the angle of rotation of the rotary member 2. However, as shown in dashed lines in FIG. 3, hysteresis of torque of the torsion springs 3, 3 in the rotational direction of the rotary member 2 is small.

Further, in this case, the cylindrical resin member 6 is interposed between the boss 1a of the fixed member 1 and the torsion springs 3, 3 located around the boss 1a, is pressed at a part of the inner periphery of the cylindrical body 6a against the boss 1a by a reaction of the torque of the torsion springs 3, 3, and is adapted to unitarily rotate with the rotary member 2. Accordingly, the rotation of the rotary member 2 creates sliding resistance between the inner periphery of the cylindrical body 6a and the outer periphery of the boss 1a, and the sliding resistance damps the rotation of the rotary member 2. It is noted that as the angle of rotation of the rotary member 2 is increased, the reaction of torque of the torsion springs 3, 3 becomes larger and therefore the damping force also becomes larger.

Figure 3:
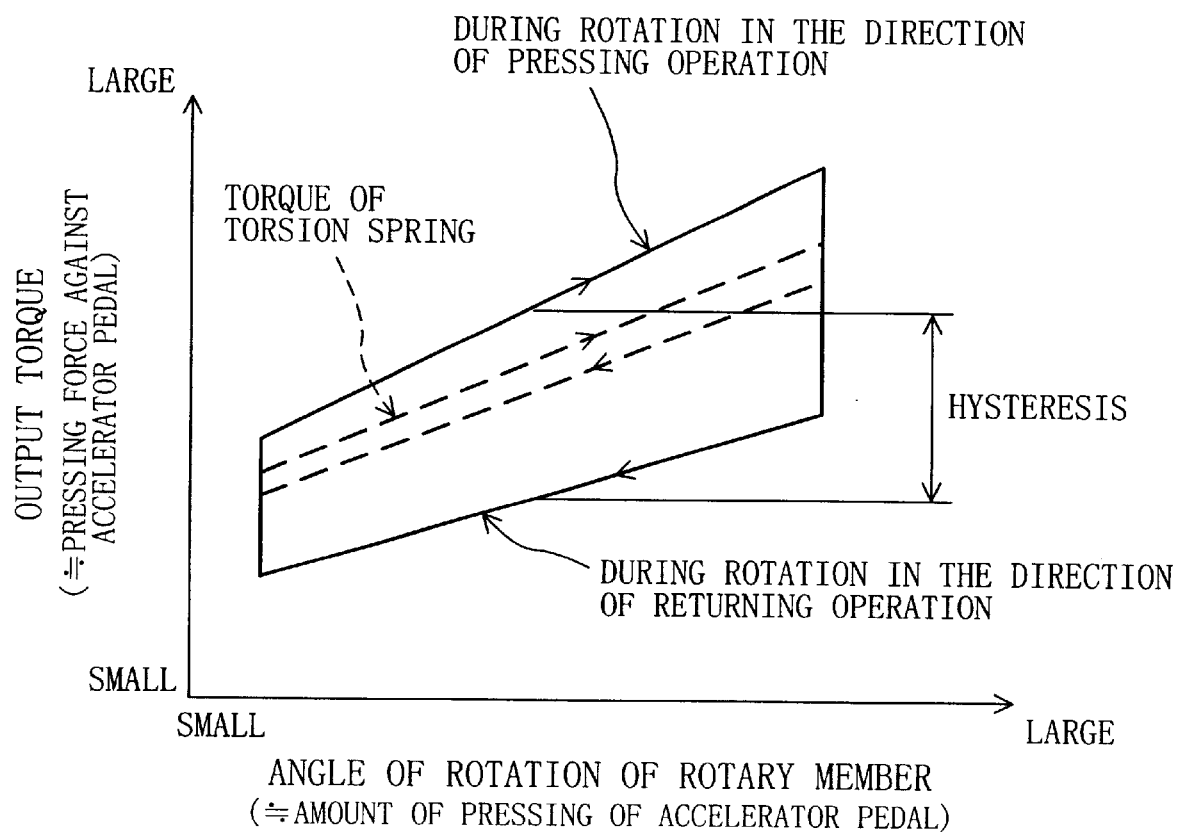
FIG. 3 is a plot schematically showing the relationship between the angle of rotation and output torque of a rotary member in the accelerator position sensor.
Figure 4:
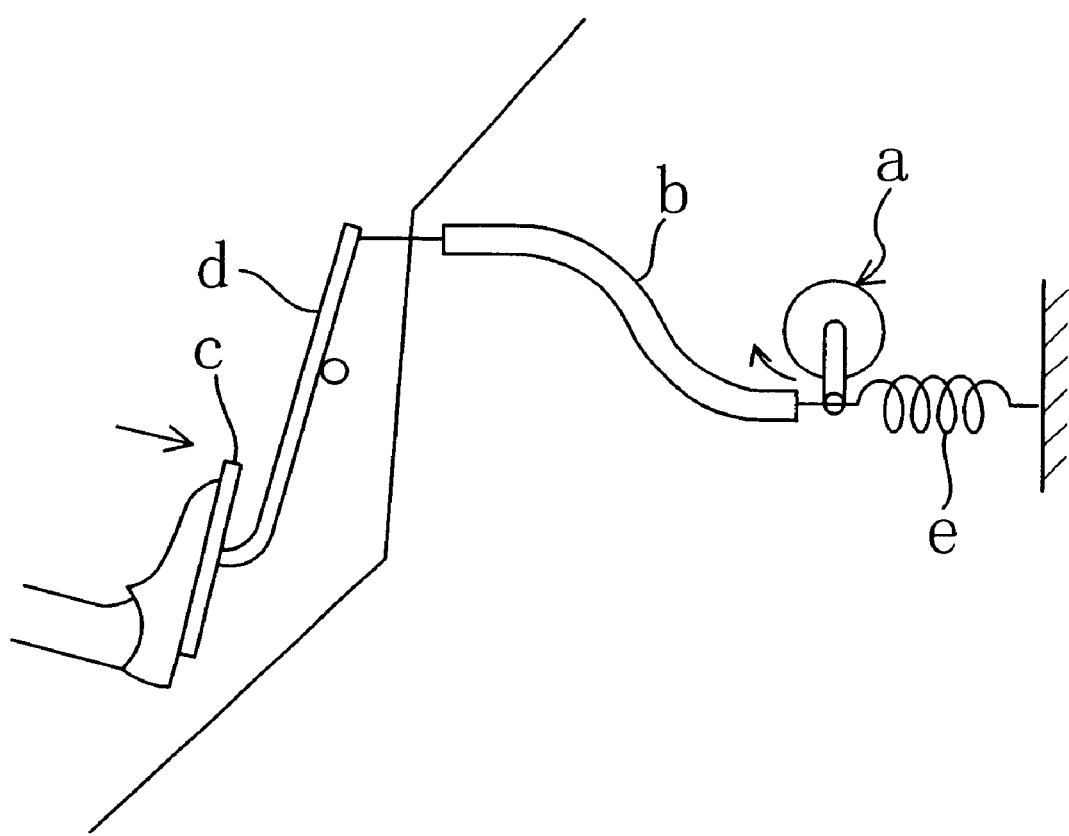
FIG. 4 is a side view schematically showing a conventional accelerator position sensor in a state drivingly connected directly to an accelerator pedal through a cable.

Consequently, as shown in solid lines in FIG. 3, output torque developing on the rotary member 2 when rotating in the direction of the pressing operation is increased by the damping force over the torque of the torsion springs 3, 3 since the damping force is added to the torque of the torsion springs 3, 3. In other words, a pressing force required during the pressing operation of the accelerator pedal P in this case is larger than that in the case where such damping does not occur. On the other hand, output torque developing on the rotary member 2 when rotating in the direction of the returning operation is decreased by the damping force under the torque of the torsion springs 3, 3 since the torque of the torsion springs 3, 3 is diminished by the damping force. In other words, a pressing force required during the returning operation of the accelerator pedal P in this case is smaller than that in the case where such damping does not occur.

According to the present embodiment, in the accelerator position sensor drivingly connected directly to the accelerator pedal P without interposing any cable therebetween, the cylindrical resin member 6 is provided between the boss 1a of the fixed member 1 and the torsion springs 3, 3 so as to be pressed against the boss 1a by a reaction of torque of the torsion springs 3, 3 to damp the rotation of the rotary member 2. Accordingly, by simply making a small change of additionally providing the cylindrical resin member 6 in the internal structure of the conventional accelerator position sensor, the pressing force characteristic of the accelerator pedal P can attain sufficient hysteresis between the pressing and returning operations.

In this embodiment, the arm 2d and the lever R are made in separate pieces. However, the arm 2d and the lever R may be made in one piece. In this case, the accelerator pedal P is engaged directly with the arm 2b.

INDUSTRIAL APPLICABILITY

The accelerator position sensor of the present invention is useful for detecting the position of an accelerator in a vehicle equipped with an electronically controlled throttle for example, and has a high degree of industrial applicability in that the pressing force characteristic of the accelerator pedal can attain sufficient hysteresis between the pressing and returning operations when the sensor is drivingly connected directly to the accelerator pedal without interposing any cable therebetween.

What is claimed is:

1. A mount for an accelerator pedal of a vehicle, comprising:

a fixed member having a boss and fixed on the side of a vehicle body of the vehicle;

a rotary member which has a shaft rotatably fitted in the boss of the fixed member the rotary member being connected to the accelerator pedal to rotate in response to pressing and returning operations of the accelerator pedal;

a torsion spring, interposed in a position fitted on the boss of the fixed member between the fixed member and the rotary member, for urging the rotary member into rotation relative to the fixed member in a direction of the returning operation of the accelerator pedal by torque of the torsion spring; and a cylindrical resin member having a cylindrical surface which is interposed between the boss of the fixed member and the torsion spring to rotate as a unit with the rotary member, wherein the cylindrical surface is positioned directly adjacent tho boss and is pressed against the boss by a reaction of the torque of the torsion spring to create sliding resistance to the boss during the rotation of the rotary member.

2. The mount of claim 1, wherein the torsion spring is interposed under axial compression between the fixed and rotary members, and the cylindrical resin member includes a cylindrical body slidably fitted on the boss of the fixed member, and a flange radically outwardly extending form the outer periphery of the cylindrical body and held axially sandwiched under pressure,.

3. A mount for an accelerator pedal for a vehicle, comprising:

a fixed member having a boss and fixed on the side of the vehicle body of the vehicle;

a rotary member which has a shaft rotatably fitted in the boss of the fixed member and which is adapted to be connected to an accelerator pedal of the vehicle to rotate in response to pressing of and returning operations of the accelerator pedal;

a torsion spring, interposed in a position fitted on the boss of the fixed member between the fixed member and the rotary member, for urging the rotary member into rotation relative to the fixed member in a direction of the returning operation of the accelerator pedal by torque of the torsion spring; and a cylindrical resin member having a cylindrical surface which is interposed between the boss of the fixed member and the torsion spring to rotate as a unit with the rotary member, wherein the cylindrical surface is positioned directly adjacent the boss and is pressed against the boss by a reaction of the torque of the torsion spring to create sliding resistance to the boss during the rotation of the rotary member.

4. The mount of claim 3, wherein the torsion spring is interposed under axial compression between the fixed and rotary members, and the cylindrical resin member includes a cylindrical body slidably fitted on the boss of the fixed member, and a flange radially outwardly extending from the outer periphery of the cylindrical body and held axially sandwiched under pressure between the torsion spring and the rotary member.

5. A combination of an accelerator position sensor and accelerator pedal mount of a vehicle, comprising:

a fixed member having a boss and fixed on the side of a vehicle body of the vehicle;

a rotary member which has a shaft rotatably fitted in the boss of the fixed member the rotary member being connected to the accelerator pedal to rotate in response to pressing and returning operations of the accelerator pedal;

a torsion spring, interposed in a position fitted on the boss of the fixed member between the fixed member and the rotary member, for urging the rotary member into rotation relative to the fixed member in a direction of the returning operation of the accelerator pedal by torque of the torsion spring;

a cylindrical resin member having a cylindrical surface which is interposed between the boss of the fixed member and the torsion spring to rotate as a unit with the rotary member, wherein the cylindrical surface is positioned directly adjacent the boss and is pressed against the boss by a reaction of the torque of the torsion spring to create sliding resistance to the boss during the rotation of the rotary member; and sensing means for detecting the angle of rotation of the rotary member relative to the fixed member.

6. The combination of claim 5, wherein the torsion spring is interposed under axial compression between the fixed and rotary members, and the cylindrical resin member includes a cylindrical body slidably fitted on the boss of the fixed member, and a flange radially outwardly extending from the outer periphery of the cylindrical body and held axially sandwiched under pressure.

7. A combination of an accelerator position sensor and accelerator pedal mount of a vehicle, comprising:

a fixed member having a boss and fixed on the side of a vehicle body of the vehicle;

a rotary member which has a shaft rotatably fitted in the boss of the fixed member and which is adapted to be connected to an accelerator pedal of the vehicle to rotate in response to pressing of and returning operations of the accelerator pedal;

a torsion spring, interposed in a position fitted on the boss of the fixed member between the fixed member and the rotary member, for urging the rotary member into rotation relative to the fixed member in a direction of the returning operation of the accelerator pedal by torque of the torsion spring;

a cylindrical resin member having a cylindrical surface which is interposed between the boss of the fixed member and the torsion spring to rotate as a unit with the rotary member, wherein the cylindrical surface is positioned directly adjacent the boss and is pressed against the boss by a reaction of the torque of the torsion spring to create sliding resistance to the boss during the rotation of the rotary member; and sensing means for detecting the angle of rotation of the rotary member relative to the fixed member.

8. The combination of claim 7, wherein the torsion spring is interposed under axial compression between the fixed and rotary members, and the cylindrical resin member includes a cylindrical body slidably fitted on the boss of the fixed member, and a flange radially outwardly extending from the outer periphery of the cylindrical body and held axially sandwiched under pressure between the torsion spring and the rotary member.

\* \* \* \* \*

UNITED STATES PATENT AND TRADEMARK OFFICE
CERTIFICATE OF CORRECTION

| | |
|---|---|
| PATENT NO. | : 6,332,374 B1 |
| DATED | : December 25, 2001 |
| INVENTOR(S) | : Someda et al. |

It is certified that error appears in the above-identified patent and that said Letters Patent is hereby corrected as shown below:

Column 6,
Line 38, change "form" to -- from --, and
Line 40, remove the "," after pressure.

Signed and Sealed this

Twenty-third Day of April, 2002

Attest:

Attesting Officer

JAMES E. ROGAN
*Director of the United States Patent and Trademark Office*